Sept. 29, 1942.   F. L. HOESS   2,297,559
SHEAR
Filed Aug. 8, 1941

FRANK L. HOESS
INVENTOR.
BY
ATTORNEY.

Patented Sept. 29, 1942

2,297,559

UNITED STATES PATENT OFFICE 2,297,559

SHEAR

Frank L. Hoess, Hammond, Ind.

Application August 8, 1941, Serial No. 406,018

8 Claims. (Cl. 164—44)

This invention relates to an improved shear which is especially adapted for use in cutting pre-formed metal strips. One of the chief objects of importance and advantage of the improved shear of this invention resides in the provision of means for constructing a substantially fool-proof and highly efficient device which will accurately cut pre-formed sheet metal strips without crushing or deforming or leaving an excessive burr along the cut edge. Moreover, the improved device may be constructed so that it may be economically marketed as compared to other devices used for a similar purpose.

The problem of properly and accurately cutting the ends of pre-formed metal strips, similar to those disclosed in my Patent No. 2,178,357, issued October 31, 1939, has given builders and others considerable difficulty. Various methods, including saws, shears, grinding and the like, have been used with limited success. Sawing and grinding usually leaves an inaccurate and excessively burred edge. Then, too, grinding is quite costly. The type of shears previously used for this work have been found to crush the pre-formed edges of the strips. Such crushing necessitated various makeshift devices for reforming the edges. The devices previously employed have in general resulted in costly operations, inaccurately cut ends, and leaky and non-weather proof joints. Additionally, as a rule they are quite costly.

The present invention solves the problems and produces a clean and accurately cut end which when used in building constructions will produce a weather tight joint. Moreover, the improved shear is relatively light and consequently it may be readily moved from job to job, and it is inexpensive.

Another and further object of advantage and importance of the improved device of this invention resides in the provision of means whereby an operator may securely hold down the material being cut as either a square or diagonal cut is made.

A still further object of advantage and importance is the provision of means for cutting the deformed edge of the metallic strip by the L-shaped blade on the handle portion of the improved shear of this invention. The cut as made, produces a clean end on each sheared portion thus eliminating waste and scrap.

An additional object of advantage and importance resides in the provision of means for removably securing an anvil in operable association with the shear. Anvils of various sizes and shapes, conforming to the sizes and shapes of the material to be cut, may be used with the improved shear of this invention.

Still another object of advantage and importance resides in the provision of means for making either right or left hand cuts, square or diagonal, with the improved device.

Additional objects of advantage and importance will become apparent as the following detailed description of the device progresses, reference being had to the accompanying drawing, wherein—

Figure 1:
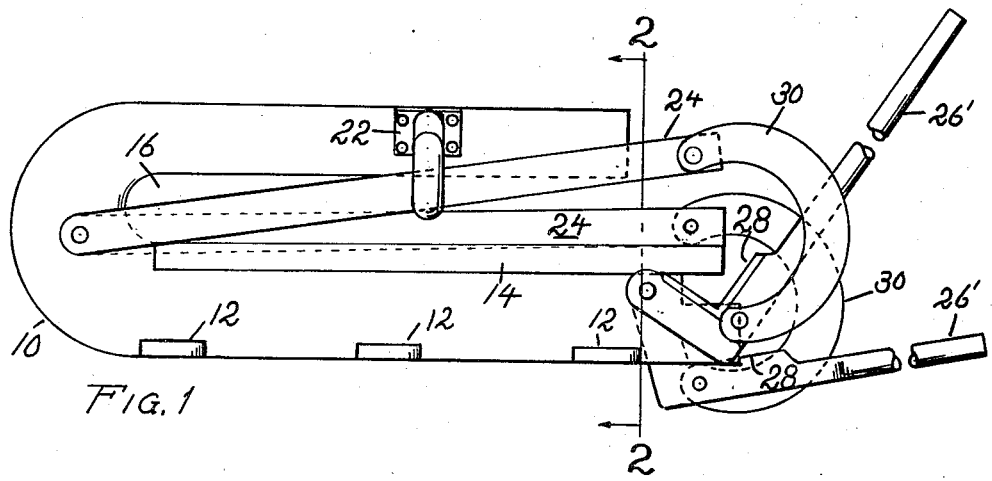
Fig. 1 is a side elevational view of a shear which embodies the invention.

The reference numeral 10, indicates generally the body of the improved shear of this invention. In the preferred embodiment of the invention the body 10, is substantially U-shaped.

Formed adjacent the lower edge of the U-shaped body 10, is a plurality of aperture securing lugs 12, 12. The securing lugs 12, provide a means for fastening the improved shear of this invention for a table, bench, horse, or other suitable working foundation.

Figure 2:
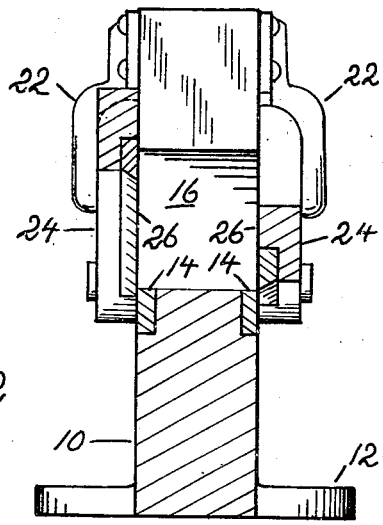
Fig. 2 is a slightly enlarged vertical section taken on line 2—2 of Fig. 1.
Figure 4:
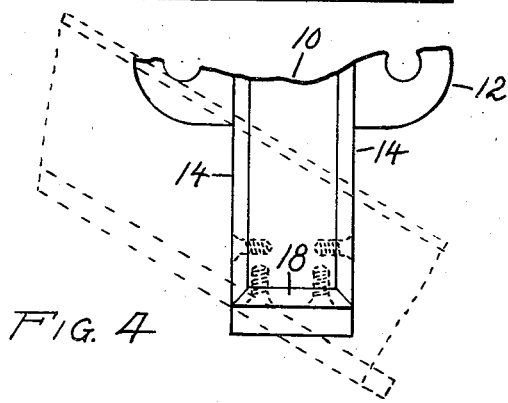
Fig. 4 is a slightly enlarged top plan view of a fragmental portion of the base. A piece of material to be cut is shown in dotted lines.
Figure 5:
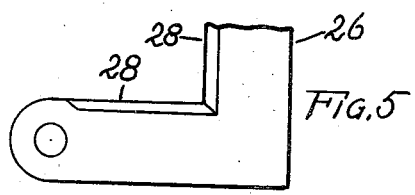
Fig. 5 is a slightly enlarged elevational view of the L-shaped cutting blade.

Removably secured to each side of the lower inside edge of the opening or throat 16, of the U-shaped body 10, is a hardened cutting blade 14. The cutting blades 14, are parallel and extend the full length of the throat or opening 16, in the U-shaped body 10, as is best shown in Figs. 1, 2, and 4.

Figure 3:
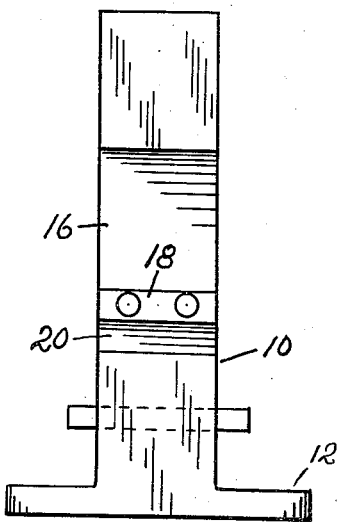
Fig. 3 is a slightly enlarged front elevational view of the stationary portion of the shear, the guides, the removable handles, and the blades being removed.

Removably secured to the lower portion of the body 10, at the front end of the opening and intermediate the front ends of the stationary blades 14, 14, is a cutting anvil 18. Formed in the stationary cutting anvil 18, is a recess 20, as is best shown in Figs. 1 and 3. The cutting edge of the anvil 18, is shown to be above the recess 20. The cutting anvil 18, is formed to correspond to the formation of the preformed metallic strips which the improved device of this invention is adapted to cut. The anvils 18, which may be quickly installed, may be made in various sizes and shapes to more efficiently handle and cut the various preformed building units.

Rigidly secured to opposed sides of the upper portion of the U-shaped body 10, are downwardly projecting guide members 22, 22. The guide members 22, 22, are adapted to urge the cutting edge of a movable blade into engagement with the cutting edge of a stationary blade during the cutting operation. The guide members 22, 22, also tend to prevent springing or warping in the movable blades during cutting operations.

Operably secured to the closed end of the U-shaped body member 10, on each side thereof is a movable blade 24. The blades 24, 24, are preferably constructed with a hardened inset cutting edge 26, 26, as is best shown in Fig. 2. The sharpened edge of the hardened cutting member is preferably ground at an angle of approximately 20 degrees. This angular grinding tends to hold the cutting edges of the shears in engagement during a cutting operation.

Pivotly secured to each side of the U-shaped member closely adjacent the front end thereof, as is best shown in Fig. 1 is a substantially L-shaped handle member 26', 26'. The inner edge of the right angle portion of each handle is sharpened as is indicated by the reference numeral 28, to form an L-shaped cutting edge. Each L-shaped cutting edge 28, 28, is positioned to operably engage, on the upward movement of the handle 26', a horizontal and vertical cutting edge of the anvil 18. This horizontal and vertical cutting of the preformed edge results in a smooth true and clean cut on each portion sheared. Scrap ends and portions are eliminated.

Operably connecting the front end of each movable blade 24, to an intermediate portion of a handle 26', is a segmental link 30. The segmental links 30, are substantially of horseshoe shape to provide sufficient clearance for the angular or diagonal positioning of stock in the improved shear and still allow the handle cutting element to be sufficiently close to the anvil to be operable.

The improved shear of this invention is best operated substantially as follows:

Both handles and their associated parts are raised to clear the throat 16, of the U-shaped body 10. Material to be sheared is then positioned in the device. In positioning the material to be sheared the flanged edge of the material is properly seated on the anvil 18. The flanged edge of the material which parallels the top surface thereof is inserted into the anvil recess 20. One of the movable blades may then be lowered onto the material to function as a hold down member. This is substantially the position in which the device is shown in Fig. 1. The other blade is then lowered to perform the cutting operation along the upper surface of the material being sheared. This downward movement of the movable blade 24, shears the material to the forward end of the stationary blade 14. The flanged edge of the material is then sheared by an upward movement of the handle which brings the cutting edge 28, into operable engagement with the cutting surface on the anvil 18, and the forward end of the blade 14. The entire cutting of the stock may be quickly accomplished without any deformation or crushing of the flanged edge of the material.

It will be apparent from the foregoing that herein is provided a sturdy and rugged shear which is highly efficient and exceedingly simple to operate. Moreover, the improved shear of this invention may be readily transported from one job to another.

It will be also apparent from the foregoing that herein is provided a manually operated shear in which either of the main blades may function as hold down members.

Additionally, means are provided for shearing a portion of the material on the up-stroke of the blade, thus preventing crushing or other injury to the formed portion of the material. Moreover, the movable main blade and the movable L-shaped blade are not required to move onward through the cut portion of the material for further shearing. Only the cutting edges of the movable blades pass the cutting edges of the stationary blades. Consequently, the cut edge is not rolled or deformed by penetration of the thickened shear blade. Accordingly, both edges of the material are finished out. Waste and scrap cuts are eliminated.

It will further be apparent to those skilled in the art to which the device appertains that numerous changes in construction and design may be made without departing from the spirit or scope of the invention. Accordingly, the patent granted hereon is not to be limited to the preferred embodiment here shown or in any other manner except as is necessitated by the terminology of the appended claims when given the range of equivalents to which they may be entitled.

I claim as my invention:

1. In a shear, a U-shaped body, a stationary blade secured to said body, a movable blade operably secured to said body, said movable blade being adapted to be moved into shearing engagement with said stationary blade on a downward stroke, a recessed anvil secured to said body at the front end of said stationary blade, certain edges of said recessed anvil being formed to provide horizontal and vertical cutting edges, a second movable cutting member positioned to shearingly engage the horizontal and vertical cutting edges of said anvil on an upward stroke, and link means secured to said first and second named blades for moving one of said movable blades away from its associated stationary blade as the other movable blade is moved toward its associated stationary blade.

2. In a manually operated shear, a body having a stationary cutting edge, the forward portion of said body being recessed, the upper edge of said recess forming a cutting edge, a movable blade positioned in shearing engagement with said first named cutting edge, and a second movable blade positioned in shearing engagement with said second named cutting edge, said first named blade being positioned to shear on a downward stroke and said second named blade being positioned to shear on an upward stroke.

3. In a shear, a U-shaped body, a stationary blade member secured to said body, the cutting edge of said blade being turned upon itself to form a two edged blade at one end thereof, a pair of movable blades operably secured to said body, said movable blades being adapted to be moved into shearing engagement with portions of said stationary blade member, one of said movable blades making a cutting engagement with a portion of the stationary blade member in a downward direction, and the other movable blade making a cutting engagement with a portion of stationary blade member in an upward direction.

4. In a shear, a body, a stationary blade member secured to said body, the cutting edge of said blade being turned upon itself to form a two edged blade at one end thereof, a pair of movable blades operably secured to said body, said movable blades being adapted to be moved into shearing engagement with portions of said stationary blade member, a segmentally shaped link member connecting said movable blades, one of said movable blades making a cutting engagement with a portion of the stationary blade member in a downward direction, the other movable blade making a cutting engagement with a portion of the stationary blade member in an upward and rearward direction, and handle means for manually operating said blades.

5. In a shear, a body, a stationary blade secured to said body, the cutting portion of said blade extending along an edge of the upper surface then downwardly along an edge of the end and thence along a portion of the lower edge of said blade, movable cutting elements operably secured to said body, one of said cutting elements being engageable with the cutting edge of the stationary blade during a downward movement of said element and the other cutting element operably engaging a portion of the cutting edge of the stationary blade on the upward and rearward movement of said cutting element, and means for manually moving said cutting elements.

6. In a manually operated shear for cutting flanged metal strips, a body, a stationary cutting element secured to said body, said element having a cutting edge extending along one edge thereof and thence being turned over an end and upon itself to form horizontal and vertical cutting edges, a pair of movable blades positioned in opposed relation to each other, one of said blades being positioned to shear on its downward travel and the other blade being positioned to shear on its upward travel.

7. In a manually operated shear, a pair of movable blades, one of said blades being adapted to be utilized as a hold down member during the shearing operation of said other blade, manual means for operating said blades, said means including a pair of substantially L-shaped handles, and an L-shaped cutting edge formed on each handle intermediate the ends thereof, said last named cutting edge being positioned to shear on the upward and rearward stroke only of said handles.

8. In a shear, a U-shaped body, a stationary blade secured to each side of said body, the forward end of said stationary blades being provided with top front and bottom cutting edges, a pair of movable blades secured to said body, said movable blades being positioned to operably engage the upper cutting edges of said stationary blades, a second pair of movable blades secured to said body, said second pair of movable blades being substantially L-shaped and being positioned to engage the lower and front cutting edges of said stationary blades, segmentally shaped link members connecting one of each pair of movable blades with the other movable blade, said blades being joined for upward or downward movement in unison, and handle means for operating said blades.

FRANK L. HOESS.